United States Patent [19]

Kanda

[11] Patent Number: 4,778,558
[45] Date of Patent: Oct. 18, 1988

[54] APPARATUS FOR HEAT SEALING MAGNETIC DISC JACKETS

[75] Inventor: Hiromichi Kanda, Tokyo, Japan

[73] Assignee: Copal Company Limited, Tokyo, Japan

[21] Appl. No.: 842,499

[22] Filed: Mar. 21, 1986

[30] Foreign Application Priority Data

Mar. 26, 1985 [JP] Japan .............................. 60-42372[U]

[51] Int. Cl.⁴ .............................................. B32B 31/20
[52] U.S. Cl. ..................... 156/498; 156/227; 156/583.4; 206/444; 360/133; 428/65; 428/900
[58] Field of Search ..................... 53/76; 156/227, 443, 156/498, 583.4; 206/312, 444; 264/339; 360/133, 135; 428/65, 900; 493/140, 946

[56] References Cited

U.S. PATENT DOCUMENTS

| | | | |
|---|---|---|---|
| 2,651,350 | 9/1953 | Casey et al. | 156/583.4 |
| 3,428,512 | 2/1969 | Cooper | 53/76 X |
| 3,449,887 | 6/1969 | Abramson | 53/76 |
| 4,062,718 | 12/1977 | Hay | 156/583.4 X |
| 4,601,689 | 7/1986 | Finkle et al. | 156/227 X |

*Primary Examiner*—Robert A. Dawson
*Attorney, Agent, or Firm*—Lynn L. Augspurger

[57] ABSTRACT

A magnetic disc jacket heat sealing apparatus for heat sealing thermally fusible tabs of a magnetic disc jacket. The apparatus includes a base on which the jacket is placed in folded form in order to be heat sealed, with the heat sealing being carried out while the base is heated to a temperature in the vicinity of the softening point of the jacket material. Such an arrangement eliminates distortion caused by residual thermal stress ascribable to a difference in temperature between the side of the jacket heated by a sealing mold and the side of the jacket contacting the base.

15 Claims, 4 Drawing Sheets

APPARATUS FOR HEAT SEALING MAGNETIC DISC JACKETS

BACKGROUND OF THE INVENTION

1. Field of the Invention

This invention relates to an apparatus for heat sealing thermally fusable tabs provided along the edges of a jacket for accommodating a flexible magnetic disc.

2. Description of the Prior Art

A magnetic disc jacket of the type described is composed of a synthetic resin sheet such as a polyvinyl chloride sheet having a non-woven liner bonded to the inner surface thereof. The jacket, shown in an unfolded condition in FIG. 1, comprises a planar, generally rectangular sheet 1 provided beforehand with openings constituting circular center holes 2a, 2b, elongate head windows 3a, 3b and index holes 4a, 4b on left and right halves of the sheet, respectively, divided by an imaginery center line L. The sheet 1 also has thermally fusible tabs 5a, 5b, 5c for heat sealing provided on the upper, lower and left edges, respectively, of the left half of the sheet as viewed in FIG. 1. The sheet 1 is folded upon itself along the center line L to bring the center holes 2a, 2b, head windows 3a, 3b and index holes 4a, 4b into register. The opposing heat sealing tabs 5a, 5b are then folded onto the right half of the sheet to provide a generally square-shaped jacket closed along three sides, namely the sides corresponding to tabs 5a, 5b and center line L, as illustrated in FIG. 2. Next, the folded tabs 5a, 5b are partially heat sealed by thermal pressing using a sealing mold, and a flexible magnetic disk is inserted into the jacket from its open edge along the as yet unfolded tab 5c. This is followed by folding the tab 5c onto the right half of the sheet and applying heat and pressure to seal the tab 5c by heat sealing.

In effecting the partial heat sealing of the folded tabs 5a, 5b of the jacket shown in FIG. 2 by heating and pressing, the base on which sheet 1 is placed for being pressed is, according to the prior art, held at a temperature at or slightly below room temperature so that portions other than the base will not be influenced by the heat involved in the heating and pressing step. As a result, when the folded jacket is placed on the base and is then heated by the sealing mold, there is a difference is temperature between the side of the jacket facing the mold and the side facing the base. Consequently, when the jacket cools following the heat sealing of the tabs, distortion sets in owing to residual thermal stress so that the jacket tends to warp as shown at numeral 50 in FIG. 3. Owing to this reduced flatness of the jacket, an appropriate torque cannot be obtained when rotating a magnetic disc inserted into the jacket. In addition, a warped jacket loaded into a magnetic disc drive is likely to damage the drive.

SUMMARY OF THE INVENTION

Accordingly, an object of the present invention is to provide a magnetic disc jacket heat sealing apparatus which solves the aforementioned problems encountered in the prior art.

Another object of the present invention is to provide a magnetic disc jacket heat sealing apparatus capable of producing a flat magnetic disc jacket which will not warp after being heat sealed.

According to the present invention, the foregoing objects are attained by providing an apparatus for heat sealing a magnetic disc jacket made of a material having a softening point and including a fusible tab, comprising a base on which the magnetic disc jacket is positioned and retained in a folded state, and heat sealing means for heat sealing the fusible tab of the magnetic disc jacket positioned and retained on the base in the folded state by applying heat to the fusable tab on one side of the magnetic disc jacket. The base has heating means for heating a side of the magnetic disc jacket opposite the one side to a predetermined temperature.

In a preferred embodiment, the base is internally provided with an adiabatic member for preventing heat from being transmitted to other portions of the apparatus. Also, the predetermined temperature is in the vicinity of the softening point of the material constituting the magnetic disc jacket.

The heating means comprises a heating element provided inside the base, and the base is inclined at a predetermined angle so that the magnetic disc jacket may slide into position under its own weight.

Preferably, the apparatus includes a positioning pin provided on the base at a predetermined position and capable of being freely projected from and retracted below a surface of the base. The pin is projected to engage and position the magnetic disc jacket when the jacket is to be heat sealed by the heat sealing means, and is retracted to disengage the jacket at completion of heat sealing, thereby allowing the jacket to slide to a succeeding process.

The heat sealing means heats the fusible tab to a temperature above the fusion point of the magnetic disc jacket.

According to another embodiment of the present invention, there is provided an apparatus for heat sealing a magnetic disc jacket made of a material having a softening point and including a fusible tab, comprising a base on which the magnetic disc jacket is positioned and retained in a folded state, heat sealing means for heat sealing the fusible tab of the magnetic disc jacket positioned and retained on the base in the folded state by applying heat to the fusible tab on one side of the magnetic disc jacket, and cooling means for cooling portions of the magnetic disc jacket other than the fusible tab thereof when the heat sealing means applies heat to the fusible tab. The base has heating means for heating a side of the magnetic disc jacket opposite the one side to a predetermined temperature.

Thus, according to the present invention, the base is heated during the heat sealing treatment of the magnetic disc jacket, thereby eliminating residual thermal stress caused by an excessive temperature difference between the side of the jacket heated by the heat sealing means and the side of the jacket contacting the base. This makes it possible to fabricate a magnetic disc jacket of improved flatness by preventing the occurrence of warping.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 4:
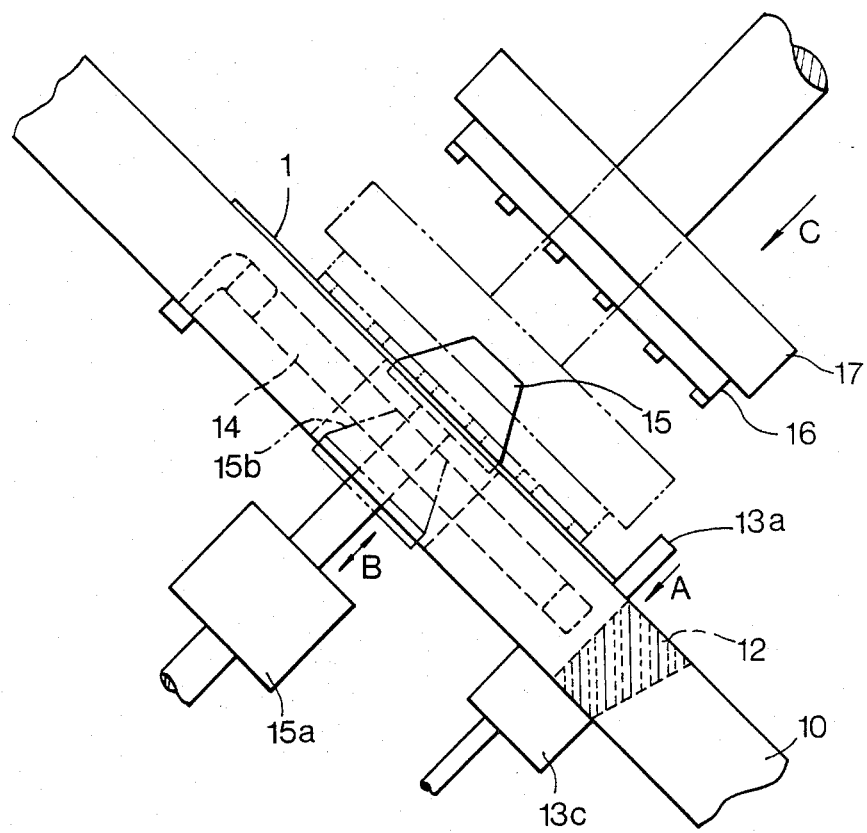
FIG. 4 is a side view illustrating an essential portion of an embodiment of a magnetic disc jacket heat sealing apparatus according to the present invention.
Figure 5:
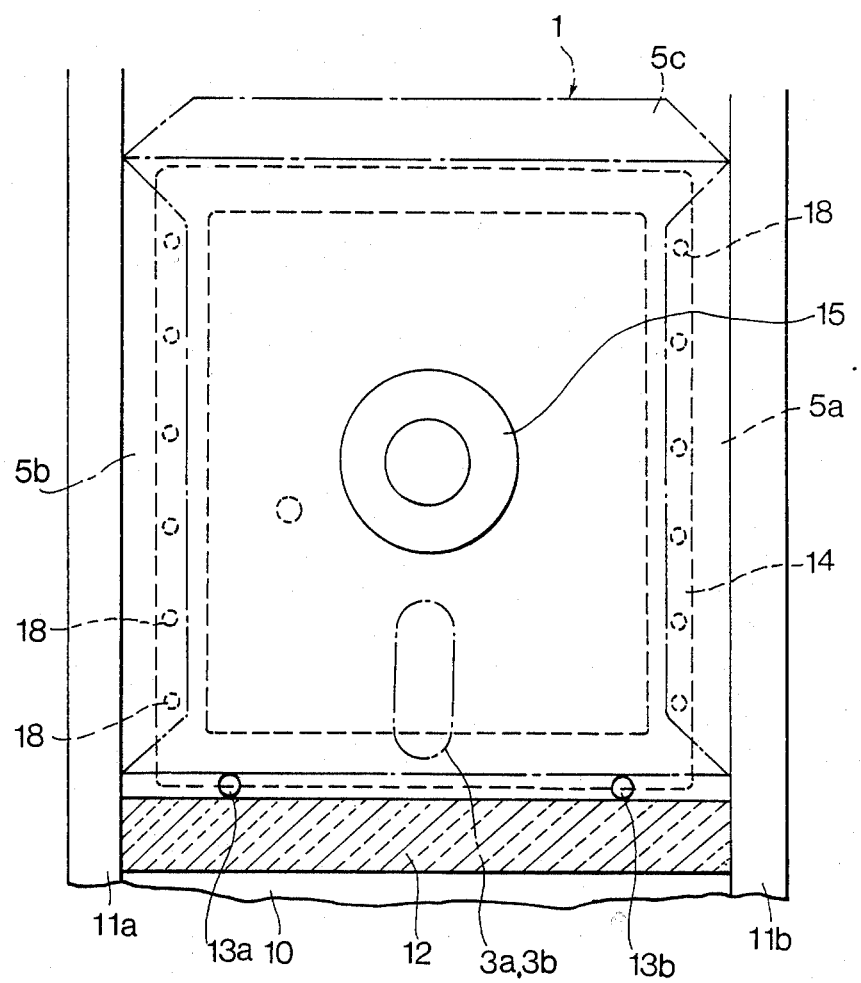
FIG. 5 is a top plan view showing a base included in the apparatus of FIG. 4.

As shown in FIGS. 4 and 5, an apparatus for heat sealing a magnetic disc jacket according to a first embodiment of the present invention includes a base 10 supported at a predetermined angle of inclination as shown and having retractable stopper pins 13a, 13b, only one of which (13a) is shown in the side view of FIG. 4. The sheet 1, folded into the state shown in FIG. 2 by folding means (not shown), is discharged by the folding means and slides downwardly under its own weight along the inclined surface of the base 10 until it abuts against the stopper pins 13a, 13b, whereby the folded sheet 1 is positioned on the base 10. The stopper pins 13a, 13b are operatively associated with respective solenoids 13c which, when energized, retract the stopper pins 13a, 13b in the direction of the arrow A until the distal ends of the pins recede below the surface of the base 10, thereby allowing the folded sheet 1 to slide downwardly under its own weight after the sheet has been subjected to a heat sealing treatment, described below. The sheet 1 allowed to fall by retraction of the stopper pins 13a, 13b is received by a cooling apparatus, not shown.

An adiabatic member 12 is disposed on the lower portion of the base 10 over the entire width thereof to prevent heat from being transmitted from a heating element 14, described below, to other portions of the apparatus.

The abovementioned heating element 14 is embedded within the base 10 and is for heating the base to a temperature near the softening point of the material constituting the jacket sheet 1, as will be set forth below. An axially movable positioning guide 15 for positioning the sheet 1 by mating with its registered center holes 2a, 2b (the state shown by the solid lines in FIG. 4) is operatively associated with a guide drive 15a for moving the positioning guide 15 back and forth in the directions indicated by arrows B. The positioning guide 15 is moved to the position indicated by the phantom lines to permit the sheet 1 to slide downwardly into contact with the stopper pins 13a, 13b when the sheet 1 is introduced to undergo the heat sealing treatment. The positioning guide 15 is moved to the same position when the pins 13a, 13b are retracted, thereby allowing the sheet 1 to slide down to the cooling apparatus at the completion of the heat sealing treatment.

A sealing mold 16 is fixedly secured to an axially movable heater block 17 having heating elements (not shown) capable of heating the mold 16 to a temperature above the fusion point of the material constituting the sheet 1. After the sheet 1 has been positioned on the base 10 by the stopper pins 13a, 13b and positioning guide 15, the heater block 17 is moved in the direction of arrow C to the position indicated by the phantom lines, thereby pressing the fusible tabs of the sheet 1 firmly against the surface of the base 10 while the tabs of the sheet are heat sealed by the sealing mold 16 heated to the aforementioned temperature.

In the top plan view of FIG. 5, the folded sheet 1 indicated by the one-dot chain line is shown positioned on the base 10 by the projecting stopper pins 13a, 13b and postioning guide 15. The sheet 1 has come to occupy this position by sliding downwardly along the inclined base 10, as mentioned above, while being guided by side guides 11a, 11b. In the heat sealing treatment, the tabs 5a, 5b of the folded sheet 1 are pressed against the base 10 and heat sealed by the sealing mold 16 in such a manner that fused points occur, as shown at numeral 18 by way of example. Extending transversely across the base 10 below the portion on which the sheet 1 is placed is the aforementioned adiabatic member 12.

Figure 1:
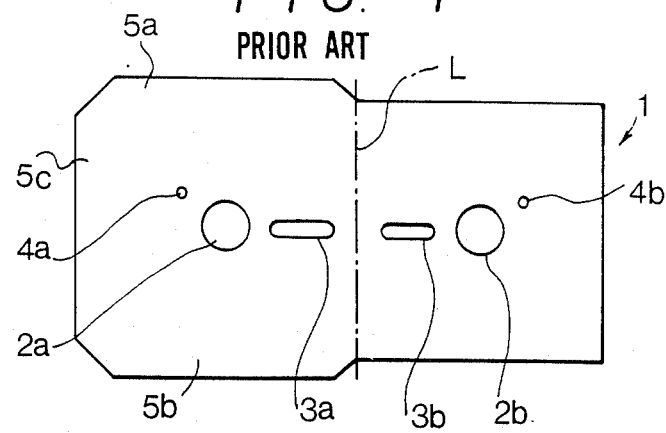
FIG. 1 is a plan view showing a jacket sheet prior to folding.
Figure 2:
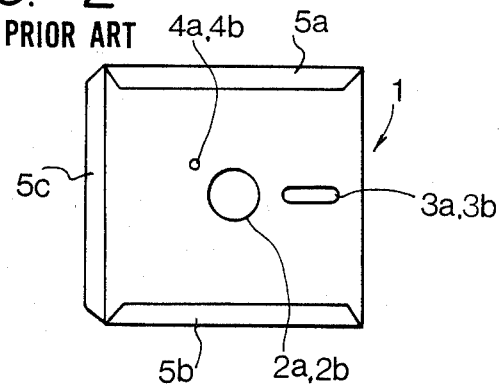
FIG. 2 is a plan view showing the jacket sheet of FIG. 1 after being folded to accommodate a flexible magnetic disc.
Figure 3:
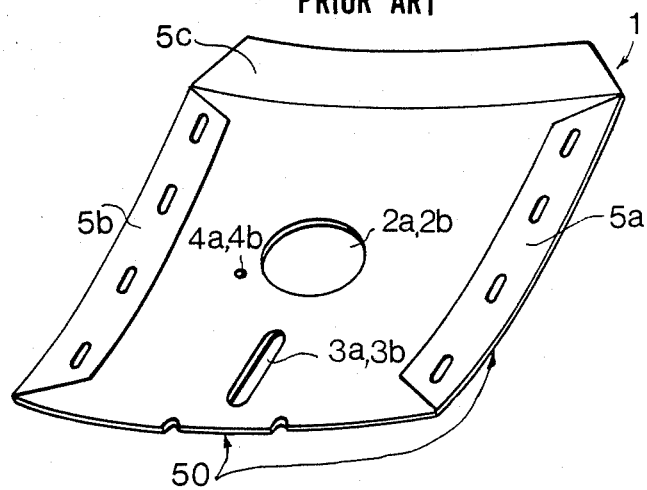
FIG. 3 is a perspective view of the folded magnetic disc jacket after being heat sealed by the conventional heat sealing apparatus, the jacket being in a warped state owing to residual heat stress.

In the illustrated embodiment, the sheet 1 consists of a vinyl chloride film. Accordingly, the heating element 14 is so controlled as to heat the base 10 to a temperature range of from 70° C. to 80° C., which is in the vicinity of the softening point of vinyl chloride film, when the sheet 1 is undergoing the heat sealing treatment on the base 10. During this heat sealing treatment, the temperature of the sealing mold 16 is held by the heating elements in the heater block 17 at about 200° C., which is slightly higher than the fusion point of vinyl chloride film, i.e., 150°-180° C. With the sheet 1 in position on the base 10, the sealing mold 16 heated to the abovementioned temperature is pressed against the sheet 1 for about 1.5-2.5 sec to heat seal the tabs 5a, 5b at the points 18, as shown in FIG. 2.

At the conclusion of this heat sealing treatment, the sealing mold 16 is raised away from the base 10, the positioning guide 15 is lowered to a point beneath the surface of the sheet 1 and the stopper pins 13a, 13b are retracted to points below the surface of the base 10, thus allowing the sheet 1 having the heat sealed tabs 5a, 5b to slide down the surface of the base 10 to the cooling apparatus.

The embodiment described above deals solely with the heat sealing of the sheet 1 by the sealing mold 16. In the second embodiment illustrated in FIG. 6, means are provided for cooling the sheet 1 so that the upper surface of the sheet will not be subjected to excessive heat when the tabs 5a, 5b are heat sealed by the sealing mold 16.

Figure 6:
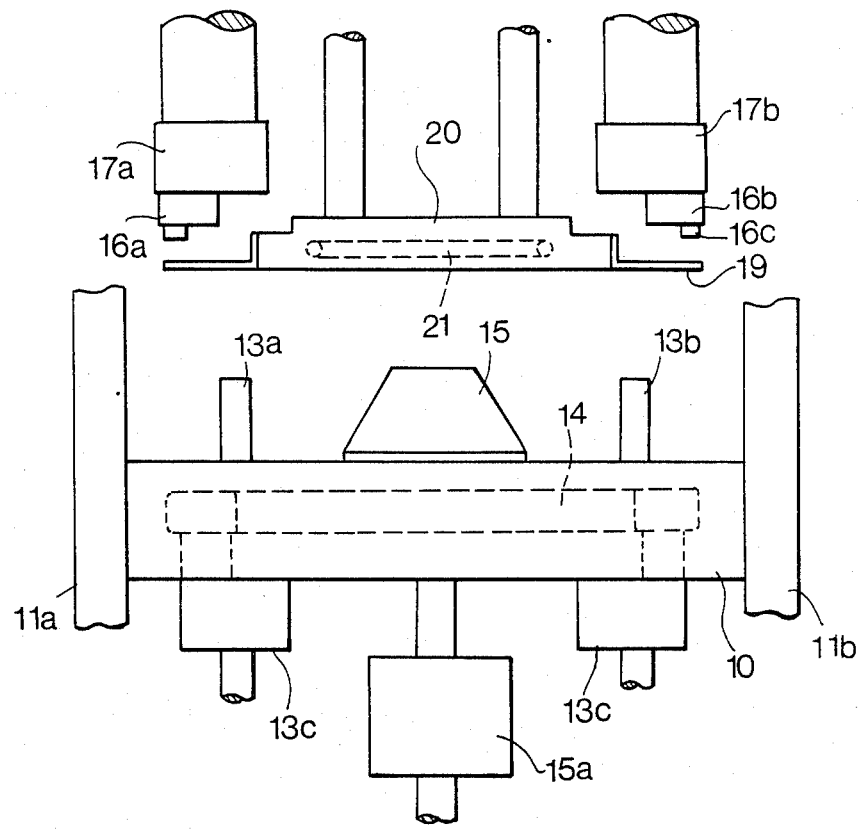
FIG. 6 is a side view illustrating an essential portion of another embodiment of a magnetic disc jacket heat sealing apparatus according to the present invention.

With reference now to FIG. 6 illustrating this second embodiment, a comb-shaped retaining plate 19 for pressingly retaining the fusible tabs 5a, 5b of the sheet 1 on the surface of the base 10 is attached to opposing sides of a cooling plate 20 capable of being brought into an out of pressing contact with the sheet 1 placed on the base 10. The cooling plate 20 internally includes a cooling pipe 21 through which a coolant is circulated. The temperature of the coolant is so controlled as to attain a value of about 15° C. (±1° C.) in summer when room temperature is high, and of about 10° C. (±1° C.) in winter when room temperature is low. The cooling plate 20 whose temperature is thus controlled is brought into pressing contact with the sheet 1 to urge the sheet against the surface of the base 10 during the heat sealing operation in order to absorb excess heat from the sheet 1. The sealing mold 16 has fusing portions 16c which come into abutting contact with the tabs 5a, 5b of the sheet 1 at the points 18 in FIG. 2 during the heat sealing operation. Owing to the tooth-shaped structure of the retaining plate 19, the latter does not interfere with these fusing portions 16c when they are pressed against the sheet 1 to heat seal the tabs thereof.

During the heat sealing of the tabs 5a, 5b performed by the sealing mold 16, the cooling plate 20 cools the sheet 1 to reduce warping to an even greater degree. This enables the fabrication of a magnetic disc jacket of even greater flatness.

As many apparently widely different embodiments of the present invention can be made without departing from the spirit and scope thereof, it is to be understood that the invention is not limited to the specific embodiments thereof except as defined in the appended claims.

What I claim is:

1. An apparatus for heat sealing a magnetic disc jacket, in which a generally rectangular sheet is folded in half and fusible tabs on two opposing sides are folded onto the folded sheet to provide after fusing a folded jacket, and the fusible tabs are heat sealed for fusing to the sheet, comprising:
    a base for receiving and retaining a generally square jacket folded closed on three sides for heat sealing after being positioned and retained on said base with said fusible tabs disposed on the upper side of said jacket; and
    heat sealing means having a sealing mold for heat sealing said fusible tabs of said jacket to a seat sealed surface side thereof by application of heat by said sealing mold at a temperature slightly higher than a melting point of the material constituting said jacket;
    said base having heating means arranged therein for heating the entirety of a side of said jacket opposite said heat sealed surface thereof and in contact with said base to a temperature in the vicinity of a softening point of the material constituting said jacket.

2. The apparatus according to claim 1, further comprising a cooling plate and means for bringing said cooling plate into pressurised contact with the heat sealed surface of said jacket when heat sealing is performed, both sides of said cooling plate having a fused portion retaining plate extending in the direction of said sealing mold.

3. The apparatus according to claim 1, wherein said base is internally provided with an adiabatic member for preventing heat from being transmitted to other portions of the apparatus.

4. The apparatus according to claim 1, wherein said heating means comprises a heating element provided inside said base.

5. The apparatus according to claim 1, wherein said base is inclined at a predetermined angle so that the magnetic disc jacket may slide into position under its own weight.

6. The apparatus according to claim 5, further comprising a positioning pin provided on said base at a predetermined position and capable of being freely projected from and retracted below a surface of said base, said pin being projected to engage and position the magnetic disc jacket when said jacket is to be heat sealed by said heat sealing means, said pin being retracted to disengage said jacket at completion of heat sealing performed by said heat sealing means, thereby allowing said jacket to slide to a succeeding process.

7. The apparatus according to claim 1, wherein said heat sealing means heats the fusible tab to a temperature above the fusion point of the magnetic disc jacket.

8. An apparatus for heat sealing a magnetic disc jacket made of a material having a softening point and including a fusible tab, comprising:
    a base on which the magnetic disc jacket is positioned and retained in a folded state;
    heat sealing means for heat sealing the fusible tab of the magnetic disc jacket positioned and retained on said base in the folded state by applying heat to the fusible tab on one side of the magnetic disc jacket; and
    cooling means for cooling portions of the magnetic disc jacket other than the fusible tab thereof when said heat sealing means applies heat to the fusible tab;
    said base having heating means for heating a side of the magnetic disc jacket opposite said one side to a predetermined temperature.

9. The apparatus according to claim 8, wherein the predetermined temperature is in the vicinity of the softening point of the material constituting the magnetic disc jacket.

10. The apparatus according to claim 8, wherein said base is internally provided with an adiabatic member for preventing heat from being transmitted to other portions of the apparatus.

11. The apparatus according to claim 8, wherein said heating means comprises a heating element provided inside said base.

12. The apparatus according to claim 8, wherein said cooling means applies a cooling temperature regulated in proportion to room temperature at a location where the apparatus is installed.

13. The apparatus according to claim 8, wherein said heat sealing means heats the fusible tab to a temperature above the fusion point of the magnetic disc jacket.

14. The apparatus according to claim 1, wherein there is provided a heater block maintaining said sealing mold at a temperature of approximately 200 degrees C. and slightly higher than a fusion point range of of 150-180 degrees C. of said jacket material, and means are provided to heat said base to a temperature range of approximately 70-80 degrees C. which is in the vicinity of the softening point of said jacket material.

15. The apparatus according to claim 8, wherein there is provided a heater block maintaining said sealing mold at a temperature of approximately 200 degrees C. and slightly higher than a fusion point range of of 150-180 degrees C. of said jacket material, and means are provided to heat said base to a temperature range of approximately 70-80 degrees C. which is in the vicinity of the softening point of said jacket material, and means are provided for supplying coolant at a temperature regulated in proportion to room temperture at a location where the apparatus is installed to a cooling plate brought into pressure contact with a heat sealed surface of the jacket and press to press against the base and the cool the jacket sheet during the heat sealing operation of the apparatus.

* * * * *